(12) United States Patent
Braylovskiy et al.

(10) Patent No.: US 8,395,361 B2
(45) Date of Patent: Mar. 12, 2013

(54) ACTIVE VOICE BAND FILTER

(75) Inventors: Michael Braylovskiy, San Mateo, CA (US); Jaspal Gill, Danville, CA (US); David Owen, Livermore, CA (US); Ben Kurolapnik, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 413 days.

(21) Appl. No.: 12/717,717

(22) Filed: Mar. 4, 2010

(65) Prior Publication Data

US 2011/0215777 A1     Sep. 8, 2011

(51) Int. Cl.
*G05F 1/70* (2006.01)
(52) U.S. Cl. ............................ 323/207; 363/127
(58) Field of Classification Search .......... 363/17, 363/21.01, 80, 81, 89, 126, 142, 132; 323/206–208, 323/284–287, 222, 235, 267; 315/240, 243, 315/247, 91, 307
See application file for complete search history.

(56) References Cited

U.S. PATENT DOCUMENTS

| | | | |
|---|---|---|---|
| 4,160,288 A | 7/1979 | Stuart et al. | |
| 5,612,609 A * | 3/1997 | Choi | 323/210 |
| 5,777,866 A * | 7/1998 | Jacobs et al. | 363/126 |
| 5,982,156 A * | 11/1999 | Weimer et al. | 323/222 |
| 6,178,104 B1 * | 1/2001 | Choi | 363/89 |
| 6,650,092 B1 * | 11/2003 | Lidak et al. | 323/207 |
| 6,771,052 B2 * | 8/2004 | Ostojic | 323/266 |

* cited by examiner

*Primary Examiner* — Rajnikant Patel
(74) *Attorney, Agent, or Firm* — Harrity & Harrity, LLP

(57) ABSTRACT

An active voice-band filter includes a regulator to regulate an input current to the regulator and to convert DC voltage from an input bus to a higher DC voltage at an output of the regulator; an output voltage feedback loop, connected to the output of a regulator, for generating an output voltage value; and a current control loop for generating a control signal to regulate an input current of the regulator, where the control signal is based on an input bus current measurement and a reference voltage value. The reference voltage value is calculated using both of the output voltage value and an input bus voltage signal. The regulator regulates the input current to the regulator, based on the control signal, to reject voice band range current harmonics from the higher DC voltage.

20 Claims, 4 Drawing Sheets

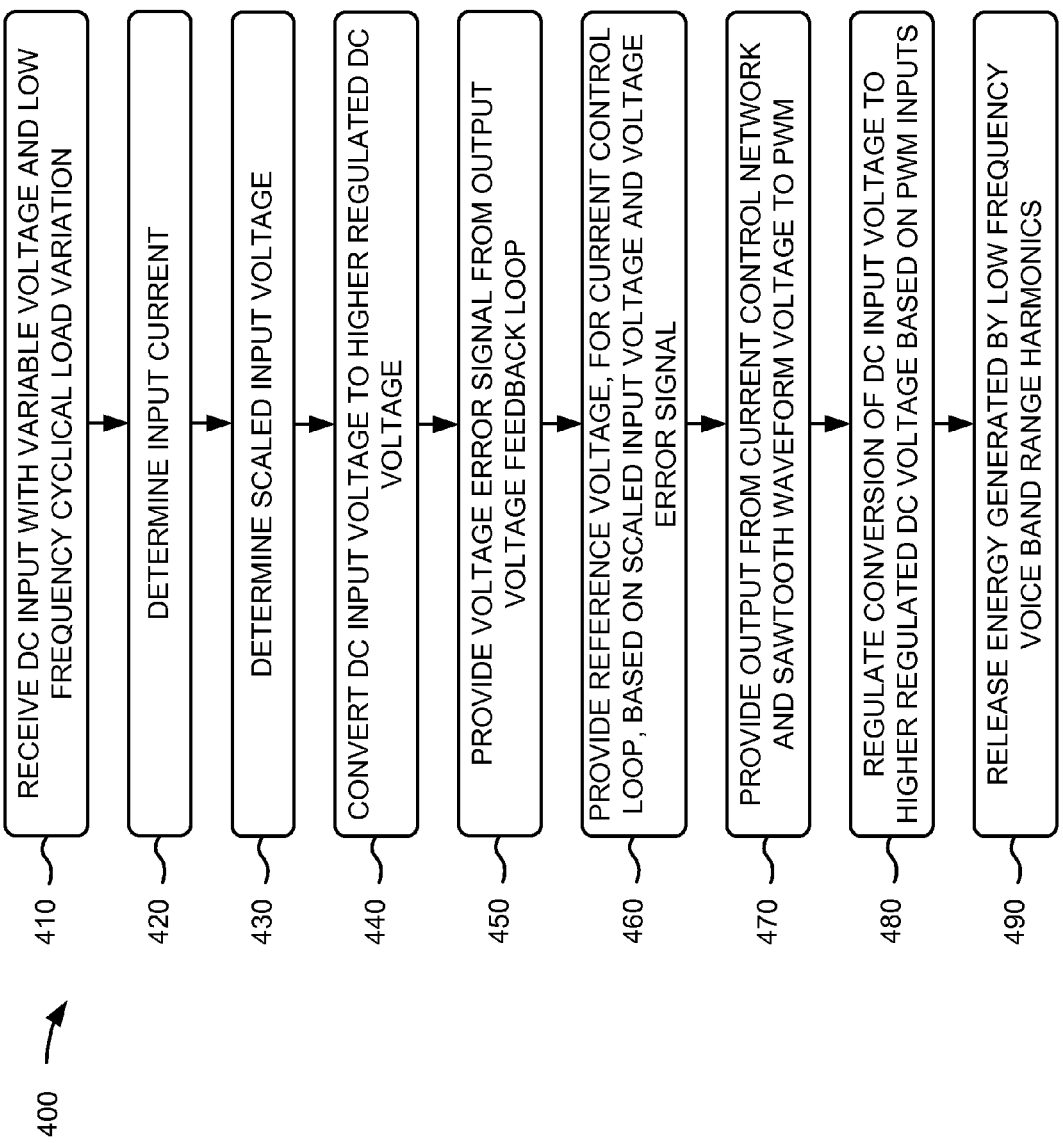

ACTIVE VOICE BAND FILTER

BACKGROUND

Network Equipment-Building System (NEBS) describes the environment of a typical United States Regional Bell Operating Company (RBOC) central office. NEBS standard GR-1089-CORE (e.g., section 10.7) specifies requirements for voice band conducted noise emissions returned by telecommunications equipment back to direct current (DC) power lines. Particularly, the electrical noise fed back from the telecommunications equipment into its input power source is required to be limited to prevent interference to other equipment sharing the same power plant and distribution system. The level of the voice band noise generated by the telecommunications equipment shall not exceed a particular threshold specified in GR-1089-CORE, section 10.7.1.

Any network device (e.g., router, switch, etc.) may be a source of low frequency voice band noise that is required to be filtered out. At the low frequency range of this noise, inductors and capacitors needed for conventional passive L-C filters become unsuitably large and heavy.

SUMMARY

According to one aspect, a power supply for a network device may include an input bus for supplying a first DC voltage within a particular range of DC voltage; a regulator, connected to the input bus, for converting the first DC voltage to a second higher DC voltage at an output of the regulator and for regulating the input current to the regulator; a variable load, connected to the output of the regulator, that exhibits a low frequency cyclical power change; an output voltage feedback loop, connected to the output of the regulator, for generating an output voltage value; and a current control loop for generating a control signal. The current control loop may include an input bus voltage sensor to generate an input bus voltage signal, a calculation component to generate a reference voltage value based on the output voltage signal and the input bus voltage signal, an input bus current sensor to generate an input bus current signal, and a current error amplifier to generate the control signal based on the reference voltage value and the input bus current signal. The regulator may regulate the input current to the regulator, based on the control signal, to reject voice band range current harmonics from the second higher DC voltage.

According to another aspect, a network device may include a DC power supply including an input DC bus that provides a particular range of DC voltage, and an active voice-band filter. The active voice-band filter may include a regulator to regulate an input current to the regulator and to convert DC voltage from the input bus to a higher DC voltage at an output of the regulator, an output voltage feedback loop, connected to the output of the regulator, for generating an output voltage value, and a current control loop for generating a control signal to regulate an input current of the regulator, where the control signal is based on an input bus current measurement and a reference voltage value, the reference voltage value being calculated using both of the output voltage value and an input bus voltage signal. The regulator may regulate the input current to the regulator, based on the control signal, to reject voice band range current harmonics from the higher DC voltage.

According to still another aspect, a method for filtering voice band noise in DC power lines. The method may include receiving, by a telecommunications networking device, a DC input with variable voltage and low frequency cyclical load variation; determining, by a resistive network, a scaled input voltage value; determining, by another resistive network, an input current value; converting, by a regulator, the DC input with variable voltage to a regulated DC output voltage; providing, by an output voltage feedback loop, an output voltage error signal for the regulated DC output voltage; providing, by a calculation component, a reference voltage, for a current control loop, based on the scaled input voltage value and the output voltage error signal; receiving, at a pulse width modulator, a control signal from the current control loop based on the reference voltage; and regulating, by the regulator, another converting of the DC input with variable voltage to a regulated DC output voltage based on the control signal.

According to a further aspect, an active voice band filter may include means for receiving a DC input with variable voltage and low frequency cyclical load variation; means for determining a scaled input voltage value; means for determining an input current value; means for converting the DC input with variable voltage to a regulated DC output voltage; means for providing an output voltage error signal for the regulated DC output voltage; means for providing a reference voltage, for a current control loop, based on the scaled input voltage value and the output voltage error signal; means for receiving a control signal from the current control loop based on the reference voltage; and means for regulating another converting of the DC input with variable voltage to a regulated DC output voltage based on the control signal.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 4 is a flow chart of an exemplary process for filtering voice band range current harmonics according to an implementation described herein.

DETAILED DESCRIPTION

The following detailed description refers to the accompanying drawings. The same reference numbers in different drawings may identify the same or similar elements. Also, the following detailed description does not limit the invention.

An implementation described herein may provide for an active voice band filter, for telecommunications equipment fed from a DC power line, that equally rejects input current harmonics in the voice band range (e.g., approximately 50 Hz to 3000 Hz) caused by low frequency cyclical load variation within a full input DC voltage range (e.g., 48 VDC nominal, or approximately 36 VDC to 75 VDC). The active voice band filter may include both voltage and current error amplifier compensation circuitry to reject voice band range current harmonics in the input current and keep the input current practically only DC.

Exemplary Network Device

Figure 1:
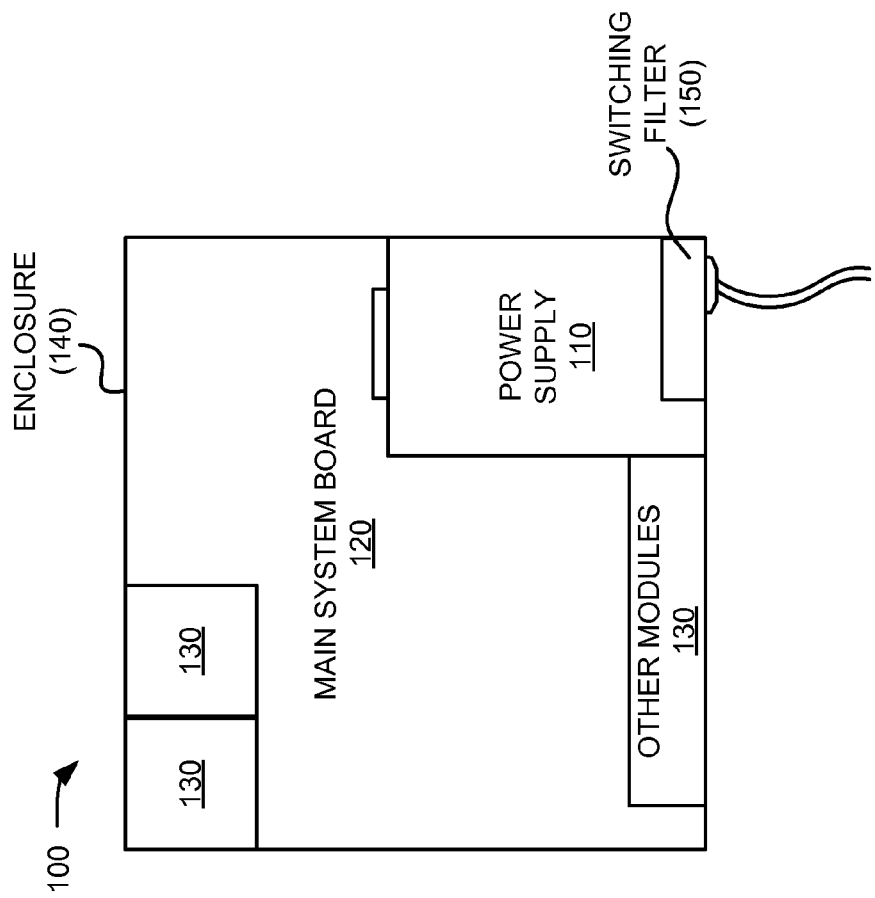
FIG. 1 illustrates a top view of an exemplary network device in which a power supply unit with an active voice band filter may be implemented.

FIG. 1 illustrates a top view of exemplary network device 100 in which a power supply unit with an active voice band filter may be implemented. In an implementation herein, network device 100 may include a data transfer device, such as a router, a gateway, a switch, a firewall, a network interface card (NIC), a hub, a bridge, a proxy server, an optical add-drop multiplexer (OADM), or some other type of device that processes and/or transfers traffic. In an exemplary implementation, network device 100 may include a device that is capable of transmitting information to and/or receiving information from other network devices 100 via a network. As shown in FIG. 1, network device 100 may include a power supply 110, a main system board 120, one or more other modules 130, and an enclosure 140.

Power supply unit 110 may include any device capable of providing power to devices operating in network device 100, such as main system board 120, other modules 130, and/or other components of network device 100. Power supply 120 may be configured to perform voltage and/or current conversion and may include one or more inputs and/or outputs. In one implementation, power supply 120 may accept an incoming direct current (DC) and provide the direct current to components operating within network device 100.

Power supply unit 110 may also include an active switching filter 150 for filtering low frequency voice band (e.g., 50-3000 Hz) noise for power supply unit 110. As shown in FIG. 1, in one implementation, filter 150 may be included as a front-end component integrated within power supply unit 110. In another implementation, filter 150 may be provided as a separate component within power supply unit 110.

Main system board 120 may include a main system board of network device 100. Main system board 120 may perform a variety of processing functions associated with the intended purpose of network device 100 (e.g., router, switch, etc.). Main system board 120 may also include various connectors to operatively connect main system board 120 to other components of network device 100.

Other modules 130 may include one or more switches, communication ports, cards, transceivers, cooling systems, and/or other modules that may change or enhance capabilities of network device 100. Other modules 130 and/or main system board 120 may contribute to low frequency voice band noise that may be required to be filtered out.

Enclosure 140 may include any structure that can be configured to act as a housing to retain and/or protect power supply 110, main system board 120, other modules 130, and/or other components that may be used to facilitate operation of network device 100. Enclosure 140 may be fabricated from metal, plastic and/or composite and may be sized for particular applications. In one implementation, enclosure 140 may be sized to fit an industry standard mounting structure, such as a networking rack.

Although FIG. 1 shows exemplary components of network device 100, in other implementations, network device 100 may contain fewer, different, differently arranged, or additional components than depicted in FIG. 1. Additionally, or alternatively, one or more components of network device 100 may perform one or more other tasks described as being performed by one or more other components of network device 100.

Exemplary Switching Filter

Figure 2:
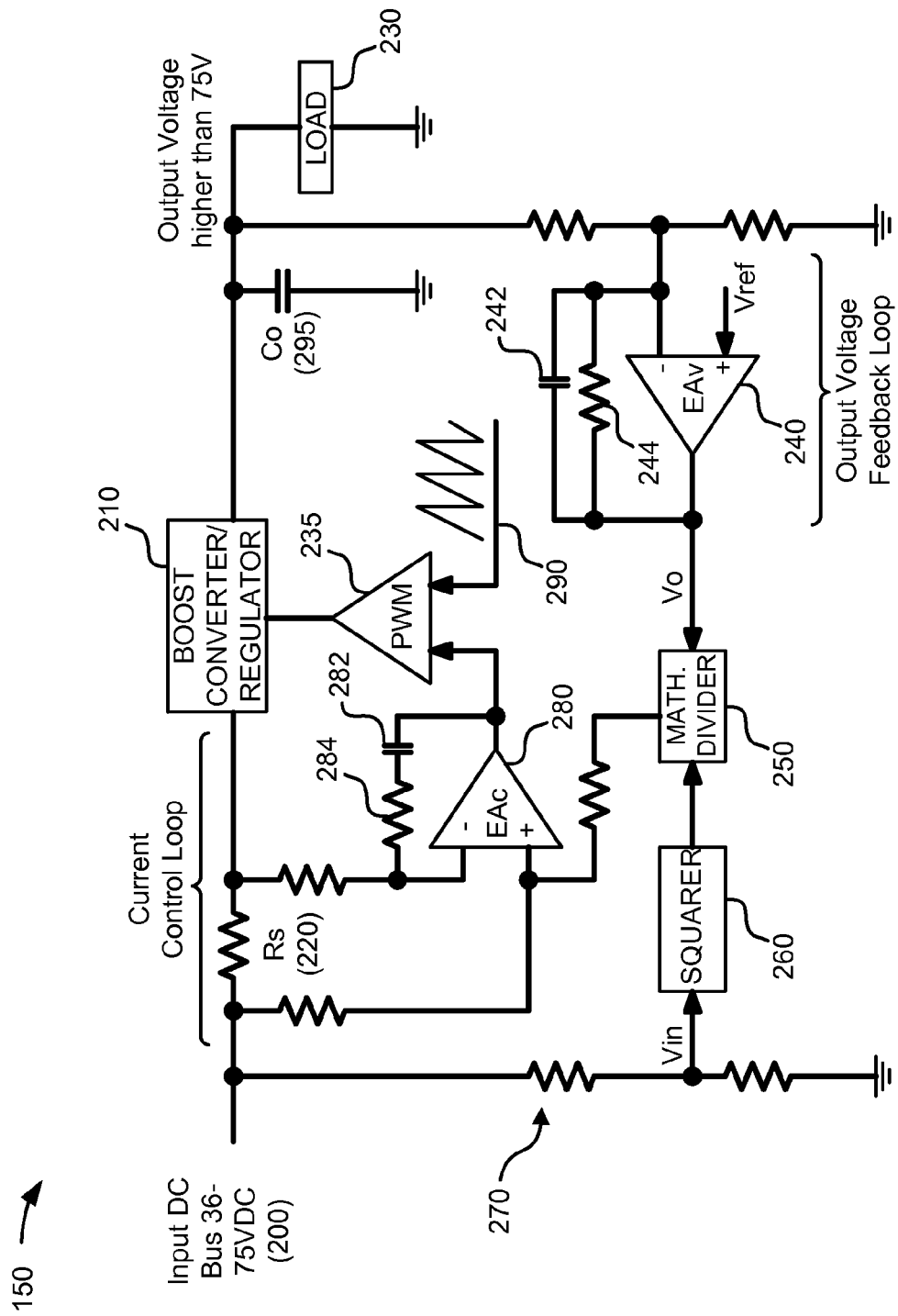
FIG. 2 is a block diagram illustrating an active voice band filter for telecommunications equipment according to an implementation described herein.

FIG. 2 illustrates switching filter 150 for telecommunications equipment according to an implementation described herein. Active filter 150 may equally reject input current harmonics in voice band range caused by low frequency cyclical load variation within a full input DC voltage range of 36-75 VDC.

As shown in FIG. 2, active filter 150 may be fed from an input DC power bus 200. Active filter 150 may include a boost converter/regulator 210 connected to the input DC power bus 200 with voltage variation from 36 VDC up to 75 VDC through one or more current-sensing resistors (Rs) 220. Boost converter/regulator 210 may convert the input voltage to a higher regulated DC voltage (e.g., greater than 75 V) which supplies a telecommunication load 230 that may be, for example, a secondary DC-to-DC converter. Regulation may be achieved by controlling the conduction times of switching transistors in boost converter/regulator 210. This controlling may be accomplished via a pulse width modulator (PMW) 235, which controls the conduction times of the switching transistors.

A voltage error amplifier (EAv) 240 may have positive and negative inputs. The negative input of voltage error amplifier 240 may be connected to the output of boost converter/regulator 210, while the positive input of voltage error amplifier 240 may be connected to a source of reference voltage (Vref). Voltage error amplifier 240 may generate a voltage error signal that connects to a first input of a mathematical divider 250. A frequency response shaping network including a capacitor 242 and a resistor 244 connected in parallel may be connected between the output of voltage error amplifier 240 and its negative input.

A second input of mathematical divider 250 may be connected to an output of a squarer 260. Squarer 260 may include a computing or computation device to derive a square value of a properly scaled input voltage. An input of squarer 260 may be connected to the DC power input voltage 200 scaled by resistive divider network 270. Although shown as separate components in FIG. 2, in another implementation, mathematical divider 250 and squarer 260 may be combined as a single calculation component.

Mathematical divider 250 may include a computing or computation device to divide the output voltage from voltage error amplifier 240 over the square of the input voltage (e.g., received from squarer 260). The output signal of mathematical divider 250 may be connected to a positive input of current error amplifier (EAc) 280 and may serve as a reference voltage for current error amplifier 280. The output signal of mathematical divider 250 may actually shape the input current sensed by a positive input terminal of current error amplifier 280 from current-sensing resistors (Rs) 220. A frequency compensation network may include, for example, a capacitor 282 and a resistor 284 connected in series between the output of current error amplifier 280 and the negative input of current error amplifier 280. Other configurations for the frequency compensation network are also possible.

The output of current error amplifier 280 may be coupled to the control input of pulse width modulator 235, and a sawtooth waveform voltage 290 is supplied as another control input so that the output of pulse width modulator 235 may establish the bias level of the sawtooth waveform voltage. Compensation circuitry for voltage error amplifier 240 and current error amplifier 280 is thus designed in such a manner to reject voice band range current harmonics in input current from input DC power bus 200 and keep the input current practically only DC. All energy generated by low frequency voice band range harmonics may be stored and released by an output capacitor (Co) 295.

Switching filters for DC-to-DC power supplies have been developed for certain applications such that control loop gain can be properly optimized to reject voice band noise only for constant input voltage. However, DC input voltage feeding certain telecommunication equipment is usually specified for a wide range from 36 VDC up to 75 VDC. Such high variation of DC input voltage can result in a high variation of control loop gain because the gain varies with square of the input voltage value. As a result of this gain variation, the bandwidth of the filter can also vary, and that will cause different noise level attenuation depending on input voltage. Thus, switching filters for constant DC input voltage applications cannot be applied directly for telecommunication equipment or other equipment receiving a wide range DC input voltage.

In operation, to keep a constant gain and a constant crossover frequency (e.g., the point at which the filter begins to work) within a full range of input voltage, an implementation described herein may utilize input voltage squarer 260 and mathematical divider 250 connected as described above. Squarer 260 derives square value of properly scaled input voltage, while mathematical divider 250 divides the output voltage over square of the input voltage. This makes the gain independent of input voltage from input DC power bus 200.

Figures 3A, 3B:
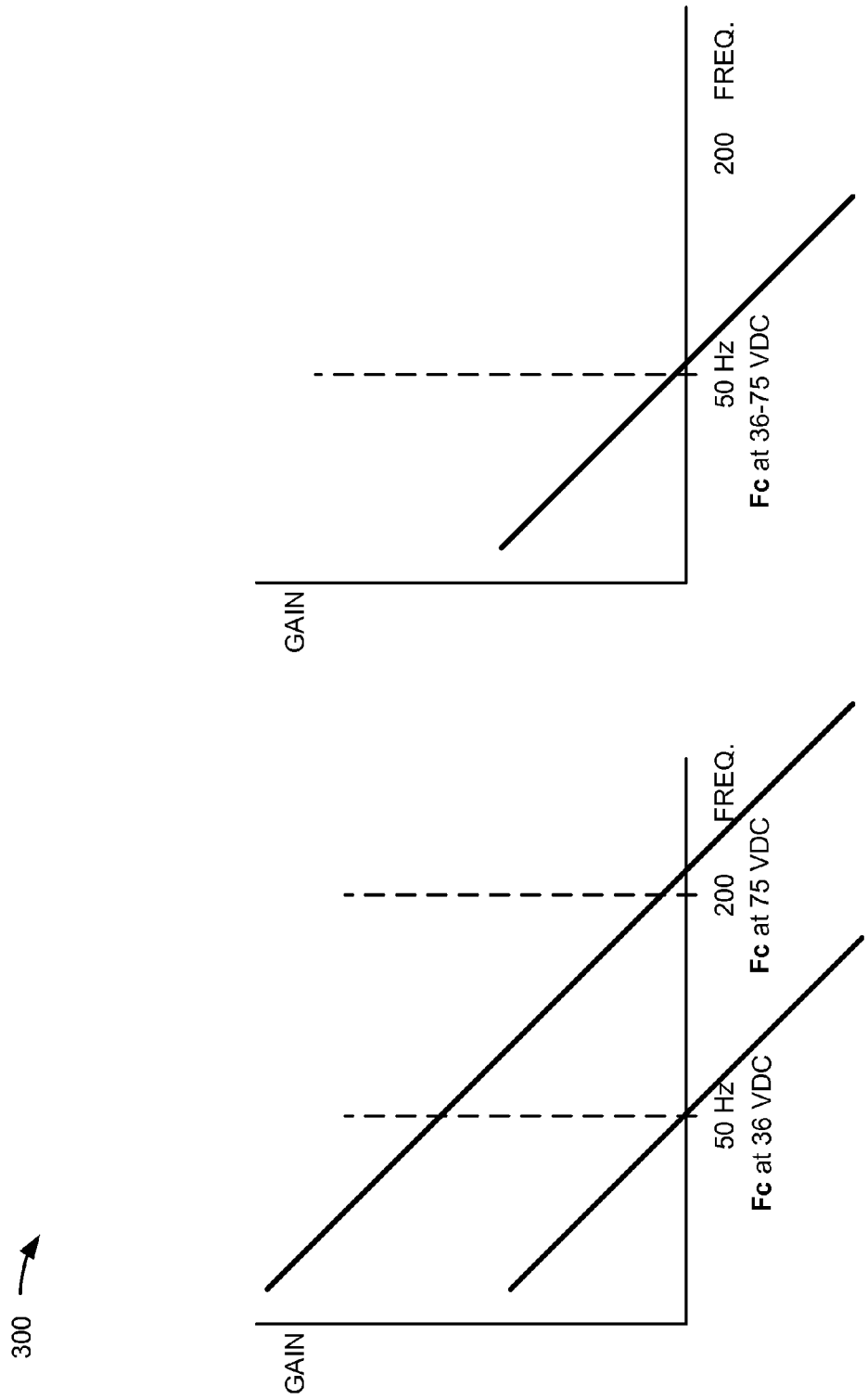
FIGS. 3A and 3B are graphs illustrating the frequency response characteristics of different current control loops for active voice band filters.

For example, without mathematical divider 250 and squarer 260, in the arrangement of FIG. 2, the total small signal gain (G) of the current control open loop would be proportional to square of the input voltage from input DC power bus 200 (Vin). Thus (when not including mathematical divider 250 and squarer 260), gain may be represented by the equation:

$$G=K*(Vin)^2$$

where G is the signal gain, K is the gain factor, and Vin is the input voltage. So, the current control open loop gain varies with the square of the input voltage. Because of this, the loop gain with Vin=36 VDC is only 0.23 (or 13 dB less) of the loop gain with Vin=75 VDC. The crossover frequency (Fc) is also directly proportional to the gain because the gain Bode plot has a single pole with slope −20 dB/decade through crossover. Therefore, Fc at 36 VDC is 0.23 of Fc at 75 VDC. As shown in FIG. 3A, if the filter is designed to have crossover Fc=50 Hz at 36 VDC then at 75 VDC it will have crossover Fc=217 Hz. This high crossover frequency of 217 Hz may not reject voice band noise harmonics of input current at 75 VDC.

In an implementation described herein, where mathematical divider 250 and squarer 260 are included in the current control loop, gain may be represented by the equation:

$$G=K(Vin)^2/(Vin)^2=K.$$

So the current control loop gain is independent of the input voltage. Thus, as, shown in FIG. 3B, the current control loop gain may remain constant for the entire voltage range of, for example, 36-75 VDC, resulting in proper attenuation of input voltage from input DC power bus 200.

Although FIG. 2 shows exemplary components of switching filter 150, in another implementation, switching filter 150 may contain fewer, different, differently-arranged, or additional components than depicted in FIG. 2. Additionally, or alternatively, one or more components of switching filter 150 may perform one or more other tasks described as being performed by one or more other components of switching filter 150.

Exemplary Processes

FIG. 4 is a flow chart of an exemplary process 400 for filtering voice band range current harmonics according to an implementation described herein. In one implementation, process 400 may be performed by switching filter 150 (FIG. 2). In another implementation, some or all of process 400 may be performed by another component of power supply 110 or network device 100.

As illustrated in FIG. 4, process 400 may include receiving a DC input with variable voltage and low frequency cyclical load variation (block 410), determining the input current (block 420), and determining the scaled input voltage (block 430). For example, in an implementation described above in connection with FIG. 2, switching filter 150 may be fed from an input DC power bus 200 with voltage variation from 36 VDC up to 75 VDC through one or more current-sensing resistors (Rs) 220, which sense the input current. The voltage from input DC power bus 200 may be scaled by resistive divider network 270.

Referring again to FIG. 4, process 400 may include converting the DC input voltage to a higher regulated DC voltage (block 440) and providing a voltage error signal from an output voltage feedback loop (block 450). For example, in an implementation described above in connection with FIG. 2, boost converter/regulator 210 may convert the input voltage to a higher regulated DC voltage which supplies a telecommunication load 230 that may be, for example, a secondary DC-to-DC converter. Voltage error amplifier (EAv) 240 may be positioned on the output side of boost converter/regulator 210 and may have positive and negative inputs. The negative input of voltage error amplifier 240 may be connected to the output of boost converter/regulator 210, while the positive input of voltage error amplifier 240 may be connected to a source of reference voltage (Vref). Voltage error amplifier 240 may generate a voltage error signal that connects to a first input of mathematical divider 250. A frequency response shaping network including a capacitor 242 and a resistor 244 connected in parallel may be connected between the output of voltage error amplifier 240 and its negative input.

Referring back to FIG. 4, process 400 may include providing a reference voltage, for a current control loop, based on the scaled input voltage and the output voltage from the feedback loop (block 460). For example, the scaled voltage value from resistive divider network 270 may be provided as input for squarer 260. Squarer 260 may determine a squared value for the scaled voltage value and provide the squared value to mathematical divider 250. Mathematical divider 250 may divide the output voltage from voltage error amplifier 240 over the square of the scaled input voltage (e.g. received from squarer 260). The output signal of mathematical divider 250 may be connected to a positive input of current error amplifier (EAc) 280 and may serve as a reference voltage for current error amplifier 280. The output signal of mathematical divider 250 may actually shape the input current sensed by a positive input terminal of current error amplifier 280 from current-sensing resistors (Rs) 220. A frequency compensation network may include a capacitor 282 and a resistor 284 connected in series between the output of current error amplifier 280 and the negative input of current error amplifier 280.

Referring back to FIG. 4, process 400 may include providing the output from the current control network and a sawtooth waveform voltage as inputs to a pulse width modulator (block 470), regulating the conversion of the DC input voltage to a higher regulated DC voltage based on the pulse width modulator inputs (block 480), and releasing energy generated by low frequency voice band range harmonics (block 490). For example, in an implementation described above in connection with FIG. 2, the output of current error amplifier 280 may be coupled to the control input of pulse width modulator 235, and sawtooth waveform voltage 290 may be supplied as another control input so that the output of pulse width modulator 235 may establish the bias level of the sawtooth waveform voltage 290. Regulation may be achieved by controlling the conduction times of switching transistors in boost converter/regulator 210. This controlling may be accomplished via the pulse width modulator 235, which controls the conduction times of the switching transistors. All energy generated by low frequency voice band range harmonics may be stored and released by output capacitor 295.

CONCLUSION

An implementation described herein may provide systems and/or methods that regulate an input current to a regulator and convert DC voltage from an input bus to a higher DC voltage at an output of the regulator. The systems and/or methods may also include an output voltage feedback loop, connected to the output of a regulator, for generating an output voltage value; and a current control loop for generating a control signal to regulate an input current of the regulator, where the control signal is based on an input bus current measurement and a reference voltage value, the reference voltage value being calculated using both of the output voltage value and an input bus voltage signal. The regulator may regulate the input current to the regulator, based on the control signal, to reject voice band range current harmonics from the second higher DC voltage.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 4, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A power supply comprising:
    an input bus to supply a first DC voltage within a particular range of DC voltage;
    a regulator, connected to the input bus, to:
        convert the first DC voltage into a second DC voltage at an output of the regulator,
            the second DC voltage being higher than the first DC voltage, and
        regulate an input current to the regulator;
    an output voltage feedback loop, connected to the output of the regulator, to generate an output voltage value; and
    a current control loop to generate a control signal, the current control loop including:
        an input bus voltage sensor to generate an input bus voltage signal,
        a calculation component to generate a reference voltage value based on the output voltage value and the input bus voltage signal,
            the calculation component including:
                a mathematical squarer to derive a square value of the input bus voltage signal, and
                a mathematical divider to divide the output voltage value by the square value of the input bus voltage signal to generate the reference voltage value,
                    the mathematical squarer being connected to the mathematical divider,
        an input bus current sensor to generate an input bus current signal, and
        a current error amplifier to generate the control signal based on the reference voltage value and the input bus current signal,
    the regulator regulating the input current to the regulator, based on the control signal, to reject voice band range current harmonics from the second DC voltage.

2. The power supply of claim 1, where the output voltage feedback loop includes a frequency response shaping network having a capacitor and a resistor connected in parallel between an output of a voltage error amplifier and a negative input of the voltage error amplifier.

3. The power supply of claim 1, where the current control loop further includes a frequency compensation component having a capacitor and a resistor connected in series between an output of the current error amplifier and a negative input of the current error amplifier.

4. The power supply of claim 1, further comprising:
    a variable load, connected to the output of the regulator, that exhibits a low frequency cyclical power change,
        the variable load including a DC-to-DC converter.

5. The power supply of claim 1, where the regulator regulates the input current to the regulator further based on a sawtooth waveform voltage.

6. The power supply of claim 1, where the particular range of DC voltage is from 36 VDC to 75 VDC.

7. A network device comprising:
    a direct current (DC) power supply including an input DC bus that provides a particular range of DC voltage, and
    an active voice-band filter, the active voice-band filter including:
        a regulator to:
            regulate an input current to the regulator, and
            convert a first DC voltage from the input DC bus to a second DC voltage at an output of the regulator,
                the second DC voltage being higher than the first DC voltage,
        an output voltage feedback loop, connected to the output of the regulator, to generate an output voltage value, and
        a current control loop to generate a control signal to regulate the input current to the regulator,
            the control signal being generated based on an input bus current measurement and a reference voltage value,
            the current control loop including:
                a mathematical squarer to derive a square value of an input bus voltage signal from an input bus voltage sensor, and a mathematical divider to calculate the reference voltage value by dividing the output voltage value by the square value of the input bus voltage signal, the mathematical squarer being connect to the mathematical divider, and the regulator regulating the input current to the regulator, based on the control signal, to reject voice band range current harmonics from the second DC voltage.

8. The network device of claim 7, where the output voltage feedback loop includes a frequency response shaping component connected between an output of a voltage error amplifier and a negative input of the voltage error amplifier.

9. The network device of claim 7, where the current control loop further includes a frequency compensation component between an output of a current error amplifier and a negative input of the current error amplifier.

10. The network device of claim 7, where the regulator regulates the input current to the regulator further based on a sawtooth waveform voltage.

11. The network device of claim 7, where the particular range of DC voltage is 36 VDC to 75 VDC.

12. A method for comprising:
receiving, by a device, a DC input with variable voltage and low frequency cyclical load variation;
determining, by the device, a scaled input voltage value;
determining, by the device, an input current value;
converting, by a regulator of the device, the DC input with the variable voltage to a regulated DC output voltage;
providing, by an output voltage feedback loop of the device, an output voltage error signal for the regulated DC output voltage;
determining, by a mathematical squarer of the device, a square value of the scaled input voltage value;
determining, by a mathematical divider of the device, a reference voltage by dividing the output voltage error signal by the square value of the scaled input voltage value,
the mathematical squarer being connected to the mathematical divider, and
the reference voltage being for a current control loop of the device;
receiving, at a pulse width modulator of the device, a control signal from the current control loop based on the reference voltage; and
regulating, by the regulator, another conversion of the DC input with the variable voltage to the regulated DC output voltage based on the control signal.

13. The method of claim 12, where a range of the variable voltage is 36 VDC to 75 VDC.

14. The method of claim 12, where a load of the of the DC input includes a telecommunications load.

15. The method of claim 12, where regulating the other converting of the DC input with the variable voltage to the regulated DC output voltage is further based on a sawtooth waveform voltage.

16. An active voice band filter comprising:
one or more components to:
determine a scaled input voltage value;
convert a DC input with variable voltage to a regulated DC output voltage;
provide an output voltage error signal for the regulated DC output voltage;
provide a reference voltage, for a current control loop of the active voice band filter, based on the scaled input voltage value and the output voltage error signal;
determine a control signal from the current control loop based on the reference voltage; and
regulate another converting of the DC input with the variable voltage to the regulated DC output voltage based on the control signal,
the one or more components including:
a mathematical squarer to determine a square value of the scaled input voltage value, and
a mathematical divider to divide the output voltage error signal by the square value of the scaled input voltage value to generate the reference voltage value, and
the mathematical squarer being connected to the mathematical divider.

17. The active voice band filter of claim 16,
where the one or more components further include an output voltage feedback loop to provide the output voltage error signal, and
where the output voltage feedback loop includes a capacitor and a resistor connected in parallel between an output of a voltage error amplifier and a negative input of an voltage error amplifier.

18. The active voice band filter of claim 16, where the regulated DC output voltage is higher than the DC input with the variable voltage.

19. The active voice band filter of claim 16,
where the one or more components further include a current error amplifier,
where the current error amplifier determines the control signal, and
where the current control loop further includes a component having a capacitor and a resistor connected in series between an output of the current error amplifier and a negative input of the current error amplifier.

20. The active voice band filter of claim 16, where, when regulating the other converting of the DC input voltage to the regulated DC output voltage, the one or more components are to:
regulate the other converting of the DC input with the variable voltage to the regulated DC output voltage based on the control signal and a sawtooth waveform voltage.

* * * * *